(12) United States Patent
Bhadra et al.

(10) Patent No.: US 9,708,188 B1
(45) Date of Patent: Jul. 18, 2017

(54) METHOD FOR ARGON PRODUCTION VIA COLD PRESSURE SWING ADSORPTION

(71) Applicant: Air Products and Chemicals, Inc., Allentown, PA (US)

(72) Inventors: Shubhra Jyoti Bhadra, Macungie, PA (US); Roger Dean Whitley, Allentown, PA (US); Garret Chi-Ho Lau, Emmaus, PA (US); David Ross Graham, Harleysville, PA (US); Donn Michael Herron, Fogelsville, PA (US); Qiao Zhao, Macungie, PA (US); Erin Marie Sorensen, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 15/049,704

(22) Filed: Feb. 22, 2016

(51) Int. Cl.
*B01D 53/047* (2006.01)
*C01B 23/00* (2006.01)

(52) U.S. Cl.
CPC ........ *C01B 23/0068* (2013.01); *B01D 53/047* (2013.01); *B01D 2256/00* (2013.01); *B01D 2256/18* (2013.01); *B01D 2257/102* (2013.01); *B01D 2257/104* (2013.01); *B01D 2259/401* (2013.01); *B01D 2259/40086* (2013.01)

(58) Field of Classification Search
CPC .............. B01D 53/047; B01D 2256/00; B01D 2256/18; B01D 2257/102; B01D 2257/104; B01D 2259/40086; B01D 2259/401; C01B 23/068

USPC ........... 95/96, 138; 62/648, 924; 252/188.28
See application file for complete search history.

(56) References Cited

U.S. PATENT DOCUMENTS

| | | | |
|---|---|---|---|
| 2,810,454 A | 10/1957 | Jones et al. | |
| 3,928,004 A | 12/1975 | Bligh et al. | |
| 3,996,028 A | 12/1976 | Golovko et al. | |
| 4,732,580 A * | 3/1988 | Jain .................... | B01D 53/0476 62/642 |
| 5,026,532 A * | 6/1991 | Gaffney .............. | C01B 21/0466 423/705 |
| 5,159,816 A | 11/1992 | Kovak et al. | |
| 5,169,413 A * | 12/1992 | Leavitt ............... | B01D 53/0462 95/121 |
| 5,313,800 A | 5/1994 | Howard et al. | |
| 5,601,634 A * | 2/1997 | Jain .................... | B01D 53/0462 62/908 |
| 5,730,003 A | 3/1998 | Nguyen et al. | |
| 6,240,744 B1 | 6/2001 | Agrawal et al. | |
| 6,500,235 B2 | 12/2002 | Zhong et al. | |
| 6,527,831 B2 | 3/2003 | Baksh et al. | |
| 7,501,009 B2 | 3/2009 | Graham et al. | |
| 2002/0121193 A1* | 9/2002 | Baksh ................. | B01D 53/0476 95/96 |
| 2002/0134240 A1* | 9/2002 | Zhong ................. | B01D 53/047 95/96 |

(Continued)

*Primary Examiner* — Frank Lawrence
(74) *Attorney, Agent, or Firm* — Eric J. Schaal

(57) ABSTRACT

Methods and systems for purifying argon from a crude argon stream are disclosed, employing pressure swing adsorption at cold temperatures from −186° C. to −20° C.; more preferably from −150° C. to −50° C.; and most preferably from −130° C. to −80° C. with oxygen-selective zeolite adsorbent. In some embodiments, the oxygen-selective zeolite adsorbent is a 4A zeolite, a chabazite, or a combination thereof.

26 Claims, 8 Drawing Sheets

(56) References Cited

U.S. PATENT DOCUMENTS

2002/0144596 A1* 10/2002 Dee ..................... B01D 53/047
                                                                        95/96

* cited by examiner

METHOD FOR ARGON PRODUCTION VIA COLD PRESSURE SWING ADSORPTION

BACKGROUND

This disclosure relates to systems and methods for production of high purity argon. More specifically, this disclosure relates to a system and a method for purifying crude argon, previously recovered from air using a cryogenic rectification column, via pressure swing adsorption at cold temperatures.

The production of argon from a cryogenic air separation unit (ASU) plant is known. The same ASU plant may also produce oxygen and/or nitrogen. Conventionally, the ASU plant will have high and low pressure distillation columns and a crude argon column, for example, as described in U.S. Pat. No. 5,313,800 to Howard et al. In some cases the crude argon column may be incorporated with the low pressure column in a divided wall configuration, for example, as described in U.S. Pat. No. 6,240,744 to Agrawal et al. For purposes of this disclosure, we disclose the production of argon, although it will be readily apparent to those of skill in the art, that oxygen and/or nitrogen enriched streams will be created that can be treated separately or returned to the ASU for further treatment.

Crude argon produced by cryogenic distillation, taken from the middle of an oxygen/nitrogen/argon separation column, can contain between 5 and 20% argon, less than 0.1% nitrogen, and balance oxygen. Crude argon taken from the top of an argon/oxygen separation column contains at least 50% by volume argon, less than 2% by volume nitrogen, and balance oxygen. More typically, this composition is at least 80% by volume argon, less than 0.5% by volume nitrogen, and balance oxygen. This level of purity is unsuitable for many end uses. Several methods have been employed to further purify the crude argon stream, including: the so-called deoxo or getter methods which require expensive metal catalysts/getters, on-site hydrogen, and potential hazards of uncontrolled exothermic reaction; cryogenic distillation alone which requires larger distillation columns that are cost prohibitive at smaller scale plants; or multiple adsorption processes each with their own drawbacks.

Several examples in the prior art (U.S. Pat. No. 2,810,454 to Jones et al., U.S. Pat. No. 3,928,004 to Allam et al., U.S. Pat. No. 3,996,028 to Golovko et al., U.S. Pat. No. 5,159,816 to Kovak et al.) utilize 4A zeolite (also known as NaA zeolite) in cryogenic adsorption processes to separate oxygen from argon. These examples teach adsorbing at feed temperatures below −100° C. to restrict argon from entering 4A pores and avoid significant argon co-adsorption. To regenerate, however, a temperature swing adsorption (TSA) cycle is taught, where heat must be applied to desorb oxygen from the adsorbent. At these regeneration temperatures, argon can enter 4A pores at a faster rate, and remain trapped in the pores if left in direct contact with the adsorbent during cool down, thereby reducing oxygen working capacity. This necessitates reduction of pressure below ambient by pulling vacuum on the adsorbent and then cooling by indirect means back to feed temperature. These thermal swings, coupled with vacuum pressure, increase the likelihood of contaminating the adsorbent with leaks to atmospheric gases.

The prior art also teaches methods to purify argon via pressure swing adsorption (PSA) or vacuum pressure swing adsorption (VPSA) at ambient temperatures using carbon molecular sieves (CMS) or other adsorbents (U.S. Pat. No. 5,730,003 to Nguyen, U.S. Pat. No. 7,501,009 to Graham et al., U.S. Pat. No. 6,500,235 to Zhong et al., Rege et al., U.S. Pat. No. 6,527,831 to Baksh et al.). These processes tend to provide lower recovery, less than 40%, unless power and capital intensive multi-train PSA processes are employed, comprising 2 or more sets of compressors and vessels (U.S. Pat. No. 6,500,235 to Zhong et al.). VPSA's also require vacuum during regeneration, increasing the chance for leaks to atmospheric contaminants. Verma et. al. describes gas uptake properties of CMS at 25° C., 0° C., and −84° C., showing enhancement of $O_2$ selectivity over Ar as temperature is decreased, however no process information such as cycle schedule, number of beds, operating conditions etc. for improving process performance indicators in terms of argon recovery or argon productivity or argon purity is mentioned. Low argon recovery from the PSA can be mitigated by recycling waste gas from the PSA back to the cryogenic distillation plant. However when CMS is used, the process requires a means to ensure that carbon is not returned to the cryogenic distillation column. For example a filtration system can be used (U.S. Pat. No. 7,501,009 to Graham et al.). In that regard, it is desirable to reduce, if not eliminate, the amount of carbon used in the system.

Thus, it is desirable to develop systems and methods for purifying argon (Ar) gas that accomplish one or more of: improving argon recovery; requiring less equipment; requiring less energy; limiting waste streams; reducing recycle of waste streams by increasing yield; limiting the amount of carbon returned to the cryogenic distillation column; reducing the need for filtration of the recycle stream; reducing bed size; increasing productivity; and other improvements. Discussed herein are systems and methods of purifying a crude argon stream satisfying one or more of these desirable qualities.

SUMMARY

Some embodiments provide a solution to the above noted problems, and/or others, with prior art systems and methods.

Some embodiments provide a method for producing a purified argon product, the method comprising providing a pressurized crude argon stream at a temperature from −186° C. to −20° C. and a pressure from 2 bara to 20 bara as a vapor, introducing the pressurized crude argon stream into a pressure swing adsorption apparatus containing an oxygen-selective zeolite adsorbent and operating at −186° C. to −20° C., withdrawing an argon enriched product from the pressure swing adsorption apparatus, and regenerating the oxygen-selective zeolite adsorbent at a pressure greater than prevailing ambient pressure. In some embodiments, the crude argon stream is fed to the PSA at a temperature from −150° C. to −50° C., in some from −130° C. to −80° C. In some embodiments, the crude argon vapor stream is fed to the PSA at a feed pressure of 2 bara to 8 bara. In some embodiments, the oxygen-selective zeolite adsorbent is selected from the 4A type zeolites and sodium exchanged chabazite (NaCHA) zeolites, in some instances the oxygen-selective zeolite adsorbent in the PSA is a sodium exchanged chabazite zeolite having a Si/Al ratio from 1.3 and 1.8 or about 1.6 (NaCHA (1.6)).

Some embodiments provide a method for producing a purified argon product, the method comprising providing a crude argon stream from a first cryogenic distillation column; vaporizing the crude argon stream; passing the crude argon vapor stream through a pressure swing adsorption apparatus; withdrawing an argon enriched product from the pressure swing adsorption apparatus; and regenerating the oxygen-selective zeolite adsorbent; characterized in that: the crude argon stream is fed to the PSA apparatus at a temperature from −186° C. to −20° C.; the PSA apparatus contains an oxygen-selective zeolite adsorbent; the temperature during PSA is not increased except as a function of pressure change and heat of adsorption; and the oxygen-selective zeolite adsorbent is regenerated at a pressure greater than prevailing ambient pressure. In some embodiments, the oxygen-selective zeolite adsorbent is selected from 4A zeolites, sodium exchanged chabazites, and combinations thereof. In some embodiments, the PSA is carried out at −150° C. to −50° C.

Some embodiments provide a system for the production of argon gas, the system comprising a pressure swing adsorption apparatus comprising at least two adsorbent beds, each containing an oxygen-selective zeolite adsorbent suitable for use at temperatures from −150° C. to −50° C.

Some embodiments of the invention are set forth below:

Embodiment 1

A method for producing a purified argon product, the method comprising: providing a pressurized crude argon vapor stream at a temperature from −186° C. to −20° C.; introducing the pressurized crude argon vapor stream into a pressure swing adsorption apparatus containing an oxygen-selective zeolite adsorbent and operating the pressure swing adsorption apparatus at a temperature from −186° C. to −20° C.; withdrawing an argon enriched product from the pressure swing adsorption apparatus; and regenerating the oxygen-selective zeolite at a pressure greater than prevailing ambient pressure; wherein the operating temperature of the pressure swing adsorption apparatus during operation is not increased except as a function of pressure change or adsorption/desorption.

Embodiment 2

The method of embodiment 1, wherein the pressurized crude argon vapor stream comes from an air distillation process produced from the top or near top of a crude argon column, having a composition comprising oxygen, nitrogen, and 50 mole % to 99.5 mole % argon.

Embodiment 3

The method of any of embodiments 1 or 2, wherein the pressurized crude argon vapor stream comprises oxygen, about 70 mole % to about 97 mole % argon, and about 0.5 mole % nitrogen.

Embodiment 4

The method of any of embodiments 1-3, wherein the pressurized crude argon vapor stream is introduced into the pressure swing adsorption apparatus at a temperature from −150° C. to −50° C., and operating the pressure swing adsorption apparatus at a temperature from −150° C. to −50° C.

Embodiment 5

The method of any of embodiments 1-3, wherein the pressurized crude argon vapor stream is introduced into the pressure swing adsorption apparatus at a temperature from −130° C. to −80° C., and operating the pressure swing adsorption apparatus at a temperature from −130° C. to −80° C.

Embodiment 6

The method of any of embodiments 1-5, wherein the pressurized crude argon vapor stream is introduced into the pressure swing adsorption apparatus at a feed pressure from 2 bara to 20 bara.

Embodiment 7

The method of any of embodiments 1-5, wherein the pressurized crude argon vapor stream is introduced into the pressure swing adsorption apparatus at a feed pressure from 2 bara to 8 bara.

Embodiment 8

The method of any of embodiments 1-7, wherein the oxygen-selective zeolite adsorbent is selected from the 4A type zeolites and sodium exchanged chabazite zeolites.

Embodiment 9

The method of any of embodiments 1-7, wherein the oxygen-selective zeolite adsorbent is a sodium exchanged chabazite zeolite having a Si/Al ratio from 1.3 to 1.8.

Embodiment 10

The method of embodiment 9, wherein the sodium exchanged chabazite zeolite has a Si/Al ratio of about 1.6.

Embodiment 11

The method of any of embodiments 1-10, wherein the pressure swing adsorption apparatus also comprises one or more equilibrium based zeolites for removing nitrogen.

Embodiment 12

The method of embodiment 11, wherein the equilibrium based zeolites for removing nitrogen are selected from sodium X-type zeolite, calcium X-type zeolite, calcium exchanged A zeolite (CaA or 5A), or combinations thereof.

Embodiment 13

The method of any of embodiments 1-12, wherein prior to introducing the pressurized crude argon vapor stream into the pressure swing adsorption apparatus, at least a portion of the pressurized crude argon vapor stream is increased in pressure to form a compressed argon-containing stream to be fed to the pressure swing adsorption apparatus.

Embodiment 14

The method of any of embodiments 1-5 and 7-13, wherein the pressurized crude argon vapor stream is created by withdrawing crude argon from an air distillation process as a low pressure vapor, warming the low pressure crude argon vapor and compressing the warmed low pressure crude argon vapor to from 2 bara to 8 bara to form the pressurized crude argon vapor.

Embodiment 15

The method of embodiment 14, further comprising cooling the pressurized crude argon vapor to from −186° C. to −20° C.

Embodiment 16

The method of any of embodiments 1-5 and 7-13, wherein the pressurized crude argon vapor stream is created by withdrawing crude argon from an air distillation process as a low pressure vapor and directly compressing the low pressure crude argon vapor to from 2 bara to 8 bara to form the pressurized crude argon vapor.

Embodiment 17

The method of embodiment 16, further comprising, adjusting the temperature of the pressurized crude argon vapor to from −186° C. to −20° C.

Embodiment 18

The method of any of embodiments 1-5 and 7-13, wherein the pressurized crude argon vapor stream is created by withdrawing crude argon from an air distillation process as a low pressure liquid, increasing the pressure of the low pressure crude argon liquid to from 2 bara to 8 bara, and vaporizing the pressurized crude argon liquid to form the pressurized crude argon vapor stream.

Embodiment 19

The method of embodiment 18, further comprising adjusting the temperature of the pressurized crude argon vapor stream to from −186° C. to −20° C.

Embodiment 20

The method of any of embodiments 1-19, wherein regenerating the oxygen-selective zeolite adsorbent is conducted at a pressure of about 0.1 bar to about 0.5 bar above prevailing ambient pressure.

Embodiment 21

The method of any of embodiments 1-20, wherein regenerating the oxygen-selective zeolite adsorbent comprises withdrawing an oxygen-enriched gas from the pressure swing adsorption apparatus and recycling it back into a cryogenic distillation column.

Embodiment 22

The method of any of embodiments 1-21, further comprising feeding the argon enriched product into a distillation column to remove nitrogen.

Embodiment 23

A method for producing a purified argon product, the method comprising: providing a pressurized crude argon stream from a first cryogenic distillation column; vaporizing the pressurized crude argon stream; introducing the vaporized crude argon stream at a temperature from −186° C. to −20° C. and a feed pressure from 2 bara to 8 bara into a pressure swing adsorption (PSA) apparatus containing an oxygen-selective zeolite adsorbent; operating the PSA apparatus at a temperature from −186° C. to −20° C.; withdrawing an argon enriched product from the PSA apparatus; and regenerating the oxygen-selective zeolite at a pressure greater than prevailing ambient pressure; wherein the operating temperature of the PSA apparatus during operation is not increased except as a function of pressure change or adsorption/desorption.

Embodiment 24

The method of embodiment 23, wherein the vaporized crude argon stream is introduced to the PSA apparatus at a temperature from −150° C. to −50° C., and operating the PSA apparatus at a temperature from −150° C. to −50° C.

Embodiment 25

The method of embodiment 23, wherein the vaporized crude argon stream is introduced to the PSA apparatus at a temperature from −130° C. to −80° C., and operating the PSA apparatus at a temperature from −130° C. to −80° C.

Embodiment 26

The method of any of embodiments 23-25, wherein the oxygen-selective zeolite adsorbent is selected from 4A zeolites, sodium exchanged chabazites, or combinations thereof.

Embodiment 27

A system for the production of argon gas, the system comprising: a pressure swing adsorption (PSA) apparatus comprising at least two adsorbent beds, each containing an oxygen-selective zeolite adsorbent suitable for use at temperatures from −150° C. and −50° C.

The description herein is meant to be illustrative in nature, those of ordinary skill in the art will readily recognize additional variations and embodiments that fall within the scope and spirit of this disclosure.

DETAILED DESCRIPTION

Figure 1:
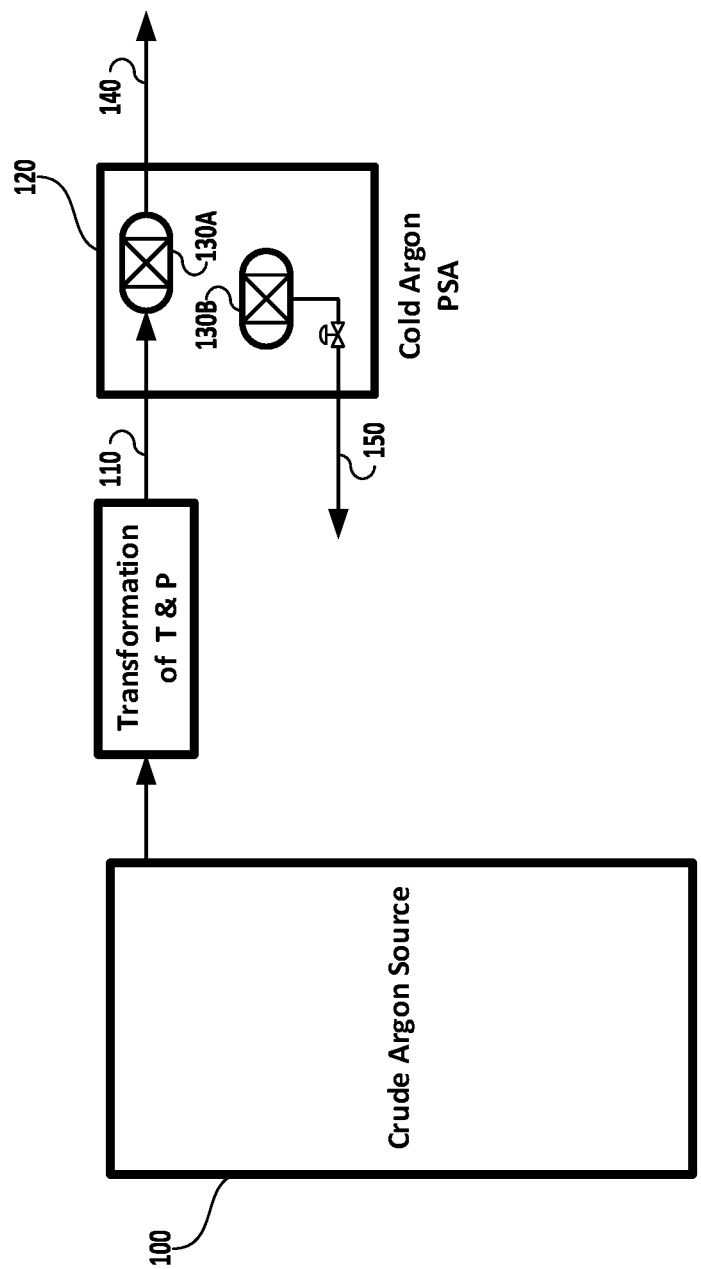
FIG. 1 shows a schematic of the basic system according to some embodiments described herein.

This disclosure focuses on the treatment of a crude argon stream produced by cryogenic air purification systems, but recognizes that any source of crude argon may be used. For example, crude argon streams may come from cryogenic air purification systems as described or as a recovered stream from industrial applications, and other sources.

As used herein, the term "column" means a distillation or fractionation column or zone, i.e., a contacting column or zone, wherein liquid and vapor phases are counter-currently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the *Chemical Engineer's Handbook*, fifth edition, edited by R. H. Perry and C. H. Chilton, McGraw-Hill Book Company, New York, Section 13, The Continuous Distillation Process. The term, double column, is used to mean a higher pressure column having its upper portion in heat exchange relation with the lower portion of a lower pressure column.

As used herein, the term "fluid" means a gas, a liquid, or combination thereof.

As used herein, the term "pressure swing adsorption," "PSA" or "pressure swing adsorber" or similar terms refer to pressure swing adsorption, not including a vacuum. When vacuum is employed in any cycle step, reference will be made to "vacuum pressure swing adsorption," "VPSA," or similar language. For clarity, the PSA involved in the disclosed methods involves pressures at or above the prevailing ambient pressure for all steps in the PSA cycle, unless otherwise noted.

As used herein, the term "ambient pressure" means the pressure of the ambient air in the location of the process.

As used herein, the term "crude argon column" means a distillation column associated with a double column cryogenic air separation plant (see U.S. Pat. No. 5,730,003, FIG. 1, unit 53). Operating pressure of the column is typically from 1 bara to 2 bara.

As used herein, the term "crude argon" means a fluid containing argon that is removed from or near the top of the crude argon column. Crude argon typically includes argon, oxygen, and nitrogen in various quantities. Depending on the source, crude argon comprises at least 50 mole % and more typically at least 80 mole % argon, with the balance being nitrogen and oxygen.

As used herein, the term "argon enriched product" means a product of a separation that has been enriched in argon, and depleted in at least oxygen.

As used herein, the term "cold compressor" means a compressor used to increase the pressure of a vapor with an inlet temperature below ambient, typically well below ambient. For example, from −186° C. to −20° C.

As used herein, the term "warm compressor" means a compressor used to increase the pressure of a vapor with an inlet temperature about ambient. The discharge fluid is cooled to near ambient temperature in a heat exchanger using an ambient cooling source such as air or water.

As used herein, the term "pressurized crude argon" means a crude argon fluid at a pressure greater than that of the crude argon column. For example, from 2 bara to 20 bara.

As used herein, the term "cold pressurized crude argon" means a crude argon fluid at a pressure from 2 bara to 20 bara and a temperature from −186° C. to −20° C.

As used herein, the term "cold Ar PSA" means a PSA used to process an argon containing feed to produce an enriched argon product. The operating pressure is always above the ambient pressure and the operating temperature is from −186° C. to −20° C.

As used herein, the term "regeneration/purge gas" means a gas, substantially free from impurities, used to desorb impurities from an adsorbent in preparation for another feed cycle.

As used herein, the term "waste gas" means a mixture of void gas and desorbed gases from the vessel during the blowdown and purge steps. It is extracted from the PSA system as a low pressure stream after feed and pressure equalization steps.

As used herein, the term "final argon processing unit" means a unit employed to provide the polishing purification and/or liquefaction of the argon-enriched product. The processing steps will be known to those of ordinary skill in Air Separation. For greater detail, refer to U.S. Pat. No. 7,501,009 to Graham et al.

As used herein, the term "pump" means a device used to raise the pressure of a liquid.

As used herein, the term "heat exchanger" means a device used to transfer heat from a hotter fluid to a colder fluid. The heat transfer is indirect in that the hotter and colder fluids do not mix but are separated by surfaces made of metal.

As used herein, the term "vaporizer" means a heat exchanger used to convert a liquid into a vapor, heat is provided by an external hot fluid.

FIG. 1 is a schematic depicting the basic system and methodology. A crude argon source 100 provides crude argon fluid that is adjusted to a temperature from −186° C. to −20° C. and pressure from 2 bara to 20 bara (Transformation of T&P) before being passed as feed gas (stream 110) to a PSA 120, shown here as a 2-bed unit. The pressure of stream 110 (as measured at the feed entrance to the PSA) defines the maximum operating pressure of the PSA. The PSA beds 130A, 130B are loaded with zeolite that has selectivity favorable for oxygen over argon. The PSA produces an argon enriched product 140, comprising a fluid that is lower in oxygen concentration than the fluid entering the PSA. The PSA also produces a waste stream 150, when the pressure in either bed 130A or 130B is reduced to 0.1 bar to 0.5 bar above the prevailing ambient pressure (as measured at the purge exit of the PSA) and purged to regenerate the zeolite adsorbent. Waste stream 150 comprises a fluid that contains higher oxygen concentration than that of the fluid entering the PSA 120 and may be fed back to an earlier part of the system, such as the air purification unit, or passed to another part of the system for further treatment.

Figure 2:
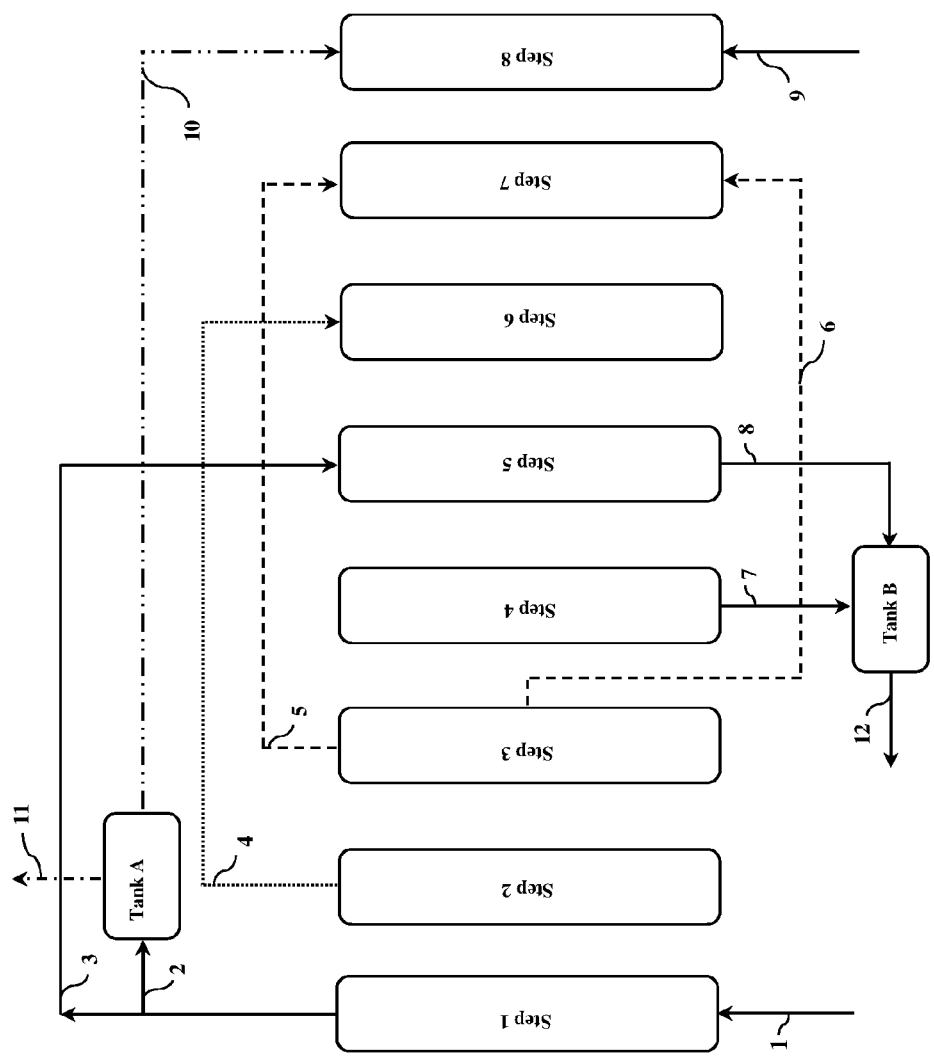
FIG. 2 is a flow chart depicting a PSA cycle used in accordance with some embodiments.

FIG. 2 depicts the specific cycle steps in an exemplary PSA process used in some embodiments. One of ordinary skill in the art will readily recognize that additional beds could be used and that the PSA cycle steps could be modified as needed, without deviating from the scope and spirit of this disclosure.

As depicted in FIG. 2, the PSA cycle can be summarized as: Step 1: feed; Step 2: equalization depressurization 1; Step 3: dual equalization depressurization 2; Step 4: counter-current blow-down; Step 5: purge; Step 6: equalization re-pressurization 1; Step 7: dual equalization re-pressurization 2; and Step 8: re-pressurization with product and feed.

The exemplary PSA cycle schedule shown here is a 2-bed multi-step process where each bed undergoes a cyclic sequence of: adsorption (feed); equalization depressurization; counter-current blow down; purge; equalization re-pressurization and re-pressurization with product and feed.

The cycle sequence shows top to top as well as middle to bottom pressure equalization. Transfer of equalization gas through the bottom (feed) end of the adsorber bed may also be considered as an effective means of pressure equalization. Transfer of equalization gas through the bottom of the adsorber bed can be accomplished with simultaneous top equalization, or instead of top equalization. These and other implementations of the PSA apparatus will be appreciated by those of ordinary skill in the art. Other cycle schedules could be used as alternate embodiments, as would be appreciated by one having ordinary skill in the art.

As described herein, the PSA beds 130A, 130B (see FIG. 1) are loaded with an $O_2$ selective zeolite. In some embodiments, the PSA beds are substantially free of carbon, particularly carbon molecular sieves (CMS), which are commonly found in other PSA methods for argon enrichment. Through choice of $O_2$-selective zeolite, and the low temperatures described herein, significant improvement in both selectivity and productivity can be achieved over prior methods, such as those employing CMS at ambient temperatures (e.g. Graham et al., U.S. Pat. No. 7,501,009).

In some embodiments, PSA is performed from $-186°$ C. to $-20°$ C.; in some embodiments from $-150°$ C. to $-50°$ C., and in some embodiments $-130°$ C. to $-80°$ C. or any value or range of values between such temperatures. The temperature during PSA is maintained simply by allowing the temperature to vary as incumbent with changes in pressure and heat of adsorption, but not by active heating or active cooling.

During the adsorption (feed) step of a PSA bed, an argon enriched stream 140 is produced. Once a PSA bed 130A or 130B (see FIG. 1) is saturated with impurity, and transfer of equalization gas is complete, it is regenerated by depressurization, followed by purge with product argon gas, countercurrently, to desorb $O_2$. This depressurization and purge gas comprises waste gas stream 150 (FIG. 1), which is high in $O_2$ concentration, and can optionally be recycled back to the crude argon source for further purification. In contrast to CMS systems, this waste gas 150, in some embodiments, is substantially free of carbon, thereby eliminating the need for a filter and reducing the likelihood of introduction of volatile carbon to the potentially oxygen-rich environment of the crude argon source. While this regeneration is occurring, the second bed is being used to produce an argon product stream. The 2-bed multi step process does not allow for a continuous feed with continuous product withdrawal. However, the use of multi-bed (more than 2 beds) PSA process allows for continuous production, as is well-known in the PSA art.

Figure 4:
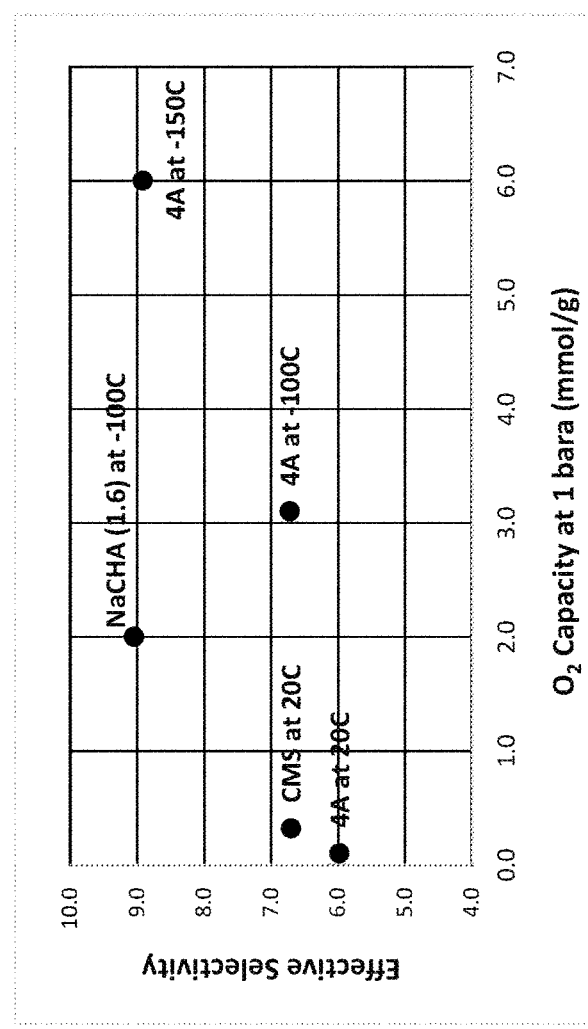
FIG. 4 is a graph depicting the effective selectivity and $O_2$ capacity of various adsorbents at different temperatures.

In some embodiments, the argon enriched product is greater than 90% argon. In some embodiments, the argon enriched product is greater than 99% argon. In some embodiments, the argon enriched product is greater than 99.99% argon. In some embodiments, the argon enriched product is greater than 99.999% argon. In some embodiments, the argon enriched product is greater than 99.9998% argon. FIG. 4 is a plot of effective $O_2$/Ar selectivity vs. $O_2$ capacity for CMS at 20° C., 4A zeolite at various temperatures, and NaCHA (1.6) at $-100°$ C. Effective selectivity is calculated from: $H_{O2}/H_{Ar}*(K_{O2}/K_{Ar})^{0.5}$, where H is the Henry's constant and K is the uptake rate constant for the respective gases. This calculation combines equilibrium selectivity and kinetic selectivity to estimate overall separation effectiveness in an adsorption process.

FIG. 4 shows that at ambient (20° C.) temperature, CMS is superior in both selectivity and $O_2$ capacity when compared to 4A zeolite at ambient (20° C.) temperature. However, at $-100°$ C., 4A zeolite demonstrates much higher $O_2$ capacity compared to CMS at ambient, and unexpectedly, maintains equivalent effective selectivity when compared to CMS at ambient. The prior art teaches that processes using 4A zeolite must operate below $-133°$ C. to achieve practical $O_2$/Ar selectivity, as illustrated by the data point of 4A at $-150°$ C. (see e.g., U.S. Pat. No. 3,996,028, Golovko.) At cryogenic temperatures, however, the prior art teaches that $O_2$ is not effectively desorbed from 4A zeolite during a pressure swing purge—heat and/or vacuum must be applied after adsorbing at $-150°$ C. to recover a steady-state $O_2$ working capacity. Applying heat and/or vacuum introduces disadvantages such as: energy intensive heated regeneration; thermal stress on equipment; and increased potential for leaks into the system. Leaks in the system are potentially even more detrimental in vacuum systems, since the vacuum draws the leaks into the system, introducing outside contaminants. According to embodiments disclosed herein, no heating or vacuum is applied during the regeneration cycle. That is, the oxygen-selective zeolite adsorbent bed is regenerated at a pressure equal to or greater than the prevailing ambient pressure. No vacuum is applied to any cycle of PSA. It is not obvious from prior art methods, that a PSA cycle on zeolite adsorbents can be performed at the low temperatures contemplated herein, for example from $-186°$ C. to $-20°$ C.; in some embodiments $-150°$ C. and $-50°$ C., and in some embodiments $-130°$ C. to $-80°$ C., while maintaining a steady state $O_2$ working capacity that substantially does not diminish with repeated cycling.

The pressure swing adsorption system, can be any suitable system, but typically comprises at least two pressure swing adsorption vessels 130A and 130B, each containing one or more layers of adsorbents. At least one of the layers comprises an oxygen-selective zeolite adsorbent, particularly one well-suited for the low temperatures involved. 4A zeolites and chabazites are useful because of their performance at these temperatures and the fact that they are free of carbon. In particular, U.S. patent application Ser. Nos. 15/049,610, 15/049,659, and 15/049,634, entitled Modified Chabazite Adsorbent Compositions, Methods of Making and Using Them, filed concurrently herewith (and hereby incorporated by reference in their entirety) describe modified chabazites that are well-suited to use in the systems and methods described herein.

In some embodiments, the adsorbent is selected from 4A zeolites, and chabazite zeolites, or combinations thereof. When used, the chabazite zeolites are typically sodium exchanged zeolites having a Si/Al ratio from about 1.3 to about 1.8, and in some embodiments about 1.6. Carbon molecular sieve adsorbents can advantageously be avoided. Other alkali exchanged chabazites such as mixed potassium-sodium chabazites may also be used.

In addition to an oxygen-selective zeolite adsorbent, the pressure swing adsorption vessel may contain additional adsorbents or particles, either as a separate layer or mixed therewith. For example, in some embodiments, a nitrogen selective adsorbent may also be used to remove nitrogen during the PSA process. The nitrogen selective adsorbent may be equilibrium based zeolites for removing nitrogen. In some embodiments, the equilibrium based zeolites for removing nitrogen are sodium X-type zeolite, calcium X-type zeolite, calcium exchanged A zeolite (CaA or 5A, where Ca exchange level is typically 80% or greater), or combinations thereof.

In some embodiments, CMS is avoided, to eliminate any introduction of carbon into the cryogenic system. The pressure swing adsorption system may operate by various cycle steps known in the art, especially the steps used in nitrogen PSA systems.

In the descriptions that follow, it is understood that the maximum feed pressure of PSA operation is from 2 bara to 20 bara, and in some embodiments 2 bara and 8 bara, while the regeneration pressure is from 0.1 bar to 0.5 bar above the prevailing ambient pressure. It also understood that the temperatures of PSA operation is from −186° C. to −20° C.; in some embodiments from −150° C. to −50° C., and in some embodiments from −130° C. to −80° C.

Figure 5:
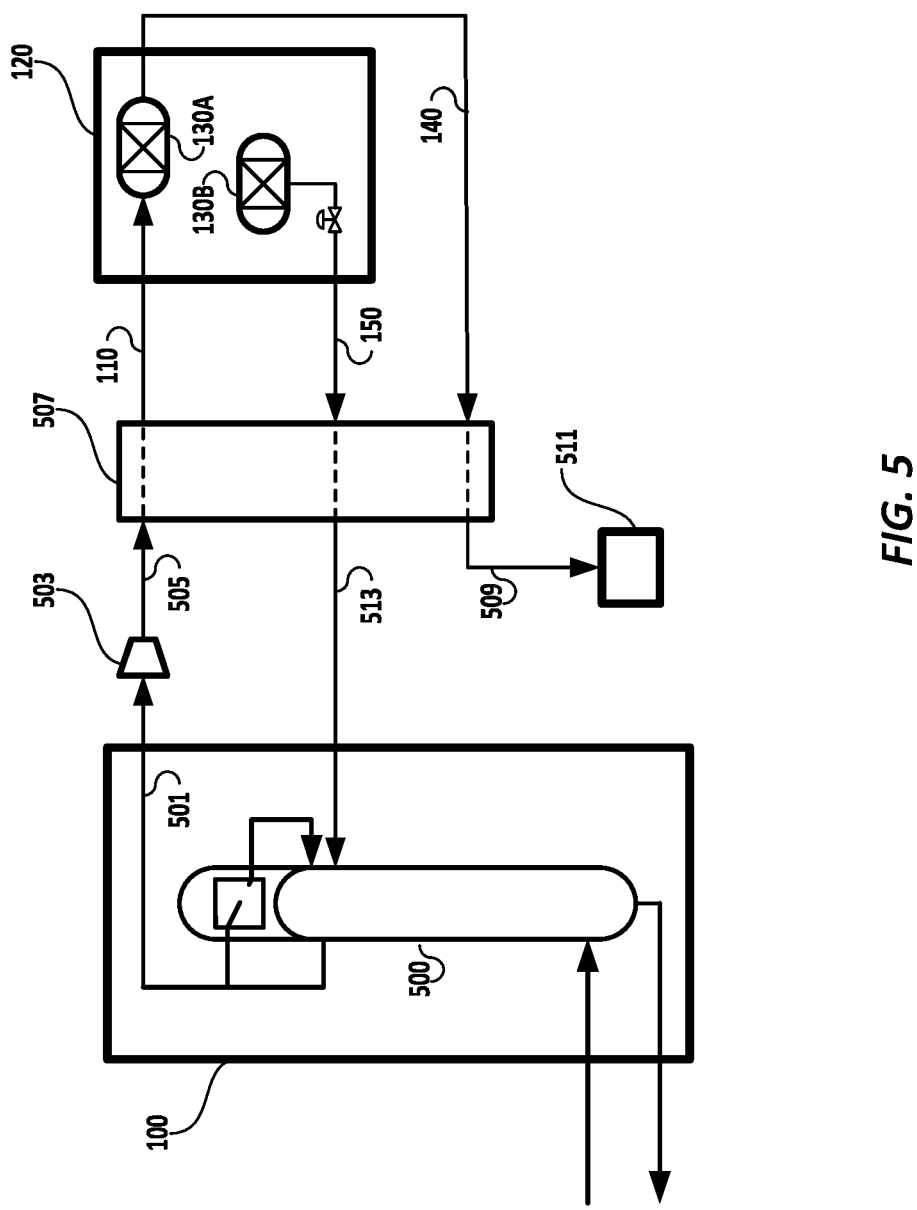
FIG. 5 is a system schematic and flow diagram in accordance with some embodiments.

One implementation of the invention is illustrated in FIG. 5. Crude argon stream 501 is produced as a vapor from or near the top of crude argon column 500. Stream 501 is raised in pressure in cold compressor 503 to form pressurized crude argon stream 505. Stream 505 is optionally warmed to the desired adsorption temperature in heat exchanger 507 to produce cold pressurized crude argon stream 110. Stream 110 feeds cold Ar PSA 120. Argon-enriched product stream 140 is produced as the product, at adsorption pressure, and waste gas stream 150 is withdrawn at a pressure lower than the adsorption pressure, but greater than the prevailing ambient pressure. Argon-enriched product stream 140 is optionally cooled in heat exchanger 507, then directed to final argon processing unit 511. Unit 511 may: liquefy all or part of stream 509 and or remove residual nitrogen impurity from stream 509. The waste gas stream 150 is optionally cooled in heat exchanger 507, then returned to crude argon column 500 as a recycle stream 513.

Due to the temperature increase associated with compressor 503, and the required temperature difference between stream 513 and 505, stream 513 may be too warm to return directly into crude argon column 500. In such an event a number of optional steps may be included in the configuration of FIG. 5. For example: 1) an additional heat exchanger may be employed to further cool stream 513 prior to its recycle to crude argon column 500; 2) an additional heat exchanger may be employed to cool stream 505 prior to its introduction into heat exchanger 507; 3) an additional cold stream may be introduced to heat exchanger 507 to provide cold-level cooling, thereby causing stream 513, and optionally stream 509, to be chilled.

Figure 6:
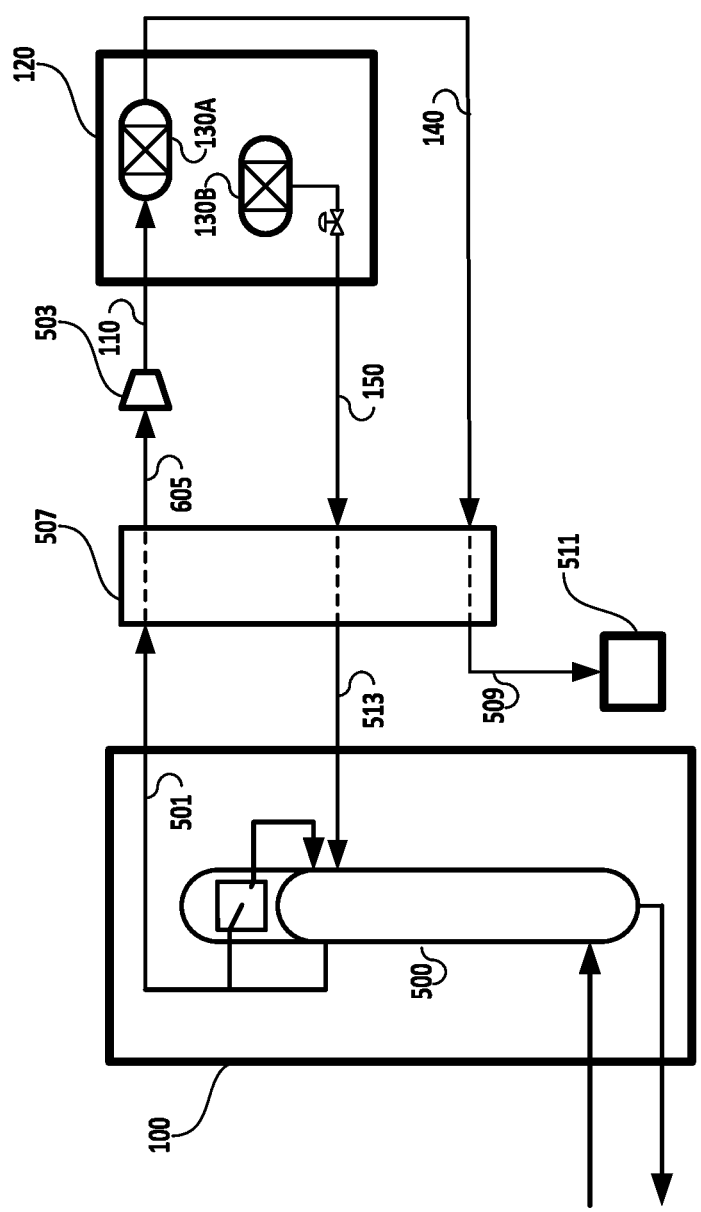
FIG. 6 is a system schematic and flow diagram in accordance with some embodiments.

Another implementation of the invention is illustrated in FIG. 6. This implementation is similar to that of FIG. 5 with the exception being the order in which crude argon stream 501 is processed. As shown in FIG. 6, stream 501 is first warmed in heat exchanger 507 to produce stream 605, which is subsequently raised in pressure in cold compressor 503 to form cold pressurized crude argon stream 110. Compared to the implementation of FIG. 5, this implementation eliminates the need to further cool stream 513, and optionally stream 509.

Figure 7:
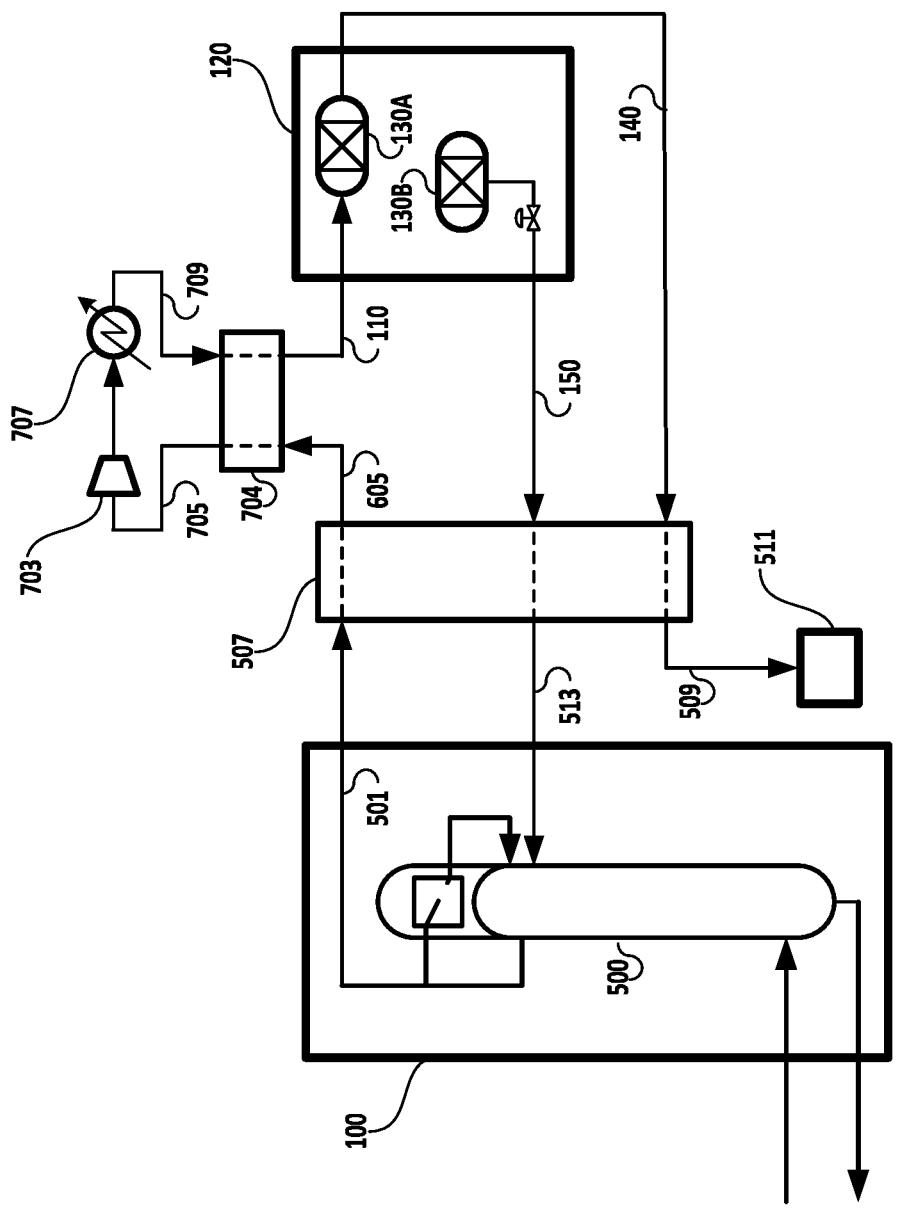
FIG. 7 is a system schematic and flow diagram in accordance with some embodiments.

Another implementation of the invention is illustrated in FIG. 7. This implementation is similar to that of FIG. 6 except cold compressor 503 is replaced with warm compressor 703; in addition, heat exchanger 704 has been added. As shown in FIG. 7, stream 501 is first warmed in heat exchanger 507 to produce stream 605. Stream 605 is further warmed to near ambient temperature in heat exchanger 704 to become stream 705. Stream 705 is raised in pressure in warm compressor 703, then the heat of compression is removed in cooler 707, thereby returning pressurized crude argon stream 709 to near ambient temperature. Stream 709 is cooled to the desired cold temperature in heat exchanger 704 to form cold pressurized crude argon stream 110. Compared to the implementation of FIG. 6, this implementation eliminates the need to construct and operate cold compressor 503.

Figure 8:
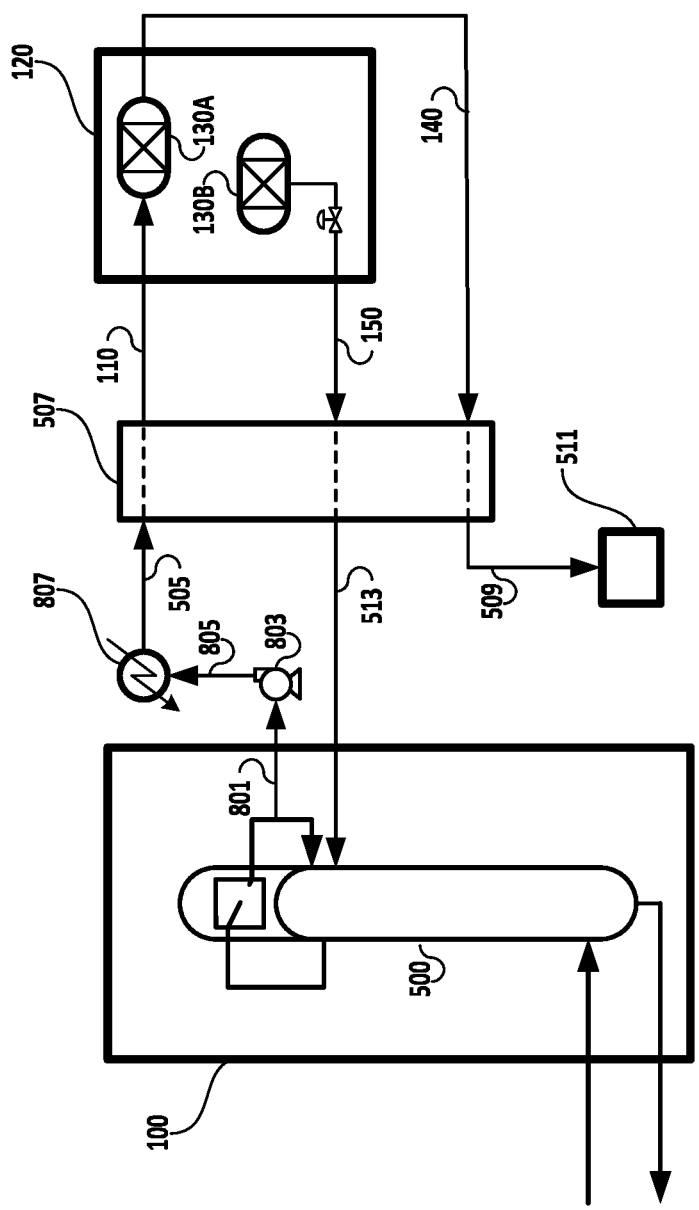
FIG. 8 is a system schematic and flow diagram in accordance with some embodiments.

Another implementation of the invention is illustrated in FIG. 8. This implementation is similar to that of FIG. 5 with several exceptions. The essential differences are: 1) source of the crude argon is a liquid instead of a vapor, and, 2) the cold compressor 503 of FIG. 5 has been eliminated and replaced with pump 803 and vaporizer 807. As shown in FIG. 8, crude argon stream 801 is produced as a liquid from or near the top of crude argon column 500. Stream 801 is raised in pressure in pump 803 to form stream 805, then vaporized in vaporizer 807 to produce pressurized crude argon stream 505. Stream 505 is optionally warmed to the desired adsorption temperature in heat exchanger 507 to produce cold pressurized crude argon stream 110. The remainder of the process is similar to that described in FIG. 5.

The heat needed to vaporize stream 805 can be provided by cooling or condensing any suitable stream associated with the main cryogenic process and would be readily identified by those of ordinary skill in air separation, such as an incoming precooled air stream. It will also be apparent by those of ordinary skill in air separation that the pump 803 may be eliminated by withdrawing liquid stream 801 from a high elevation, and allow the liquid to flow down to low elevation before vaporization in vaporizer 807. The transition of liquid from high elevation to low elevation causes the pressure of the liquid to increase due to an effect known as static head. Examples of techniques used to vaporize and raise pressure without pumps is illustrated in U.S. Pat. No. 5,730,003.

Further embodiments in PSA cycle and integration of the PSA to a cryogenic distillation column, regarding control of the recycle flow, are described in Graham et al U.S. Pat. No. 7,501,009.

EXAMPLES

The following examples were modeled and evaluated by a dynamic simulation computer program, as is commonly used in the industry. The simulation assumes a crude argon stream comprising about 94.95% Ar, 5% $O_2$, and the remainder $N_2$ which is representative of a crude argon stream produced via cryogenic rectification.

Example 1: Argon Production Via Cold Vapor PSA with 4A Zeolite

The method and systems depicted in FIGS. 1 and 2 employing the 2-bed, 8-step cold argon PSA process shown in FIG. 2 is used to calculate process performance indicators in the form of primary product (Ar) recovery and productivity using 4A zeolite adsorbent. Each adsorption bed packed with 115.4 kg of adsorbent is 2.44 m long and 0.30 m diameter. The PSA cycle is operated by following the sequence shown in FIG. 2 at a pressure and a temperature of 4.96 bara, and −130° C., respectively. Assuming that the bed has been previously pressurized to the highest pressure level of the cycle with primary product gas, the feed gas mixture containing 94.95 mole % Ar, 5 mole % $O_2$ and remainder $N_2$ is introduced to the inlet end of bed and the un-adsorbed gas (first purified Ar) is discharged from the outlet end of bed. The feed step is continued until the mass transfer zone of preferentially adsorbed component ($O_2$) reaches the exit end of the bed without substantially breaking through it. The flow rate during the feed step (Step 1) is maintained at 28.40

Figures 3A, 3B, 3C:
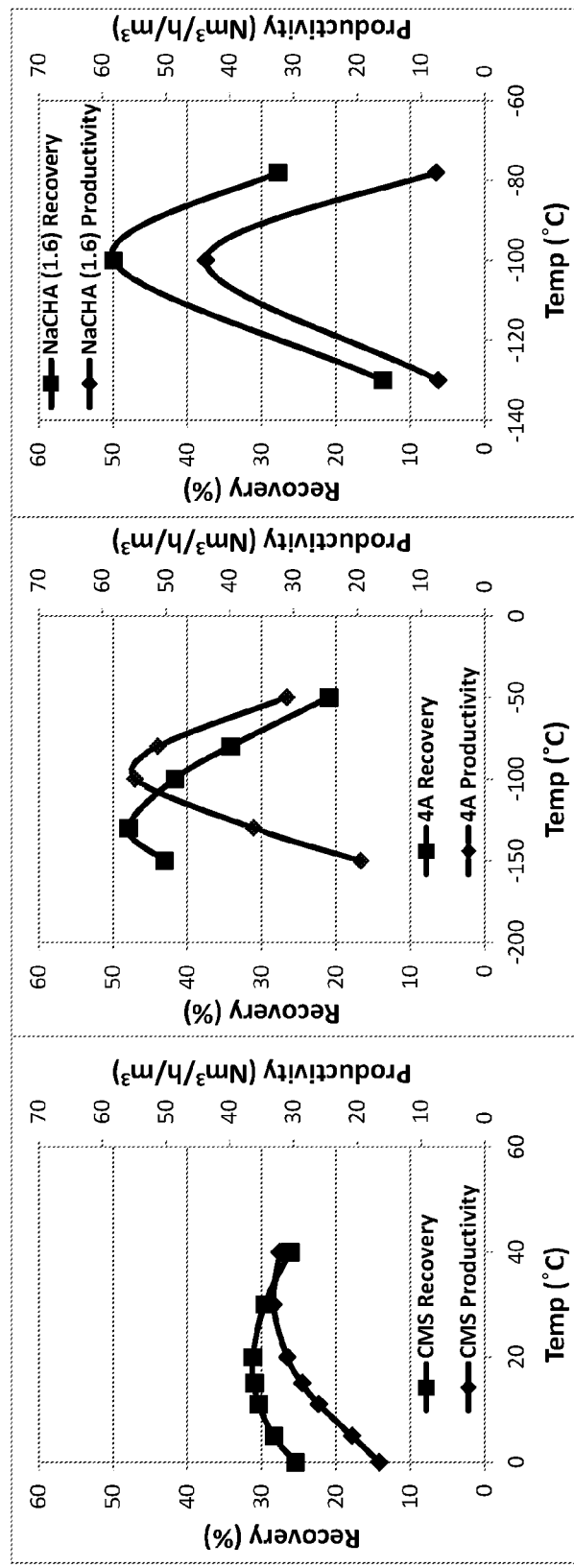
FIG. 3A is a graph depicting the simulated recovery and productivity performance of CMS at ambient temperatures.
FIG. 3B is a graph depicting the simulated recovery and productivity performance of a 4A zeolite at cold temperatures.
FIG. 3C is a graph depicting the simulated recovery and productivity performance of a sodium chabazite at cold temperatures.

Nm³/h and the effluent gas containing 2.0 ppm O₂ at nearly feed pressure and temperature is withdrawn from the product tank (Tank A) as stream 11 (FIG. 2) at a rate of 12.93 Nm³/h. At the termination of the feed step, the bed is connected with the 2nd bed undergoing equalization re-pressurization step (Step 6) and a portion of the void as well as desorbed gas is transferred from the product end of 1st bed to the product end of 2nd bed, thus lowering the 1st bed pressure to approximately 3.78 bara at the end of this step (Step 2). Following step 2, a dual end equalization de-pressurization step (Step 3 in FIG. 2) is introduced to transfer more co-adsorbed as well as void gases from the 1st bed to the 2nd bed from both ends of the bed and therefore, the pressure of the 1st bed goes down to approximately 3.11 bara. The dual end re-pressurization can be performed by connecting top ends of the columns and the middle or bottom end of the first bed to the bottom end of the second bed. The column is then counter-currently de-pressurized (Step 4) and thereafter purged (Step 5) counter-currently with primary product gas at 1.32 bara (where the ambient pressure is 1.013 bara). Following the purge step, the column is subsequently pressurized through pressure equalization (Steps 6 and 7) and pressurization (Step 8) steps to bring back the pressure level for initiation and repetition of the aforementioned cycle. With all the steps, the full cycle completes in 750 seconds. The net O₂-free (mostly) argon recovery from the feed gas is 47.93% and the productivity is 36.33 Nm³/h/m³ bed (FIG. 3B). This demonstrates that the proposed process can be used to remove O₂ from a feed gas at low temperature. Further removal of N₂ can be accomplished optionally via distillation or a second layer of adsorbent in the PSA.

Example 2: Argon Production Via Cold Vapor PSA with NaCHA (1.6)

The method and systems depicted in FIGS. 1 and 2 employing the 2-bed, 8-step cold argon PSA process shown in FIG. 2 is used to calculate process performance indicators in the form of primary product (Ar) recovery and productivity using NaCHA (1.6) adsorbent. Each adsorption bed packed with 115.4 kg of adsorbent is 2.44 m long and 0.30 m diameter. The PSA cycle is operated by following the sequence shown in FIG. 2 at a pressure and a temperature of 4.96 bara, and −100° C., respectively. Assuming that the bed has been previously pressurized to the highest pressure level of the cycle with primary product gas (purified Ar), the feed gas mixture containing 94.95 mole % Ar, 5 mole % O₂ and remainder N₂ is introduced to the inlet end of bed and the un-adsorbed gas (mostly Ar) is discharged from the outlet end of bed. The feed step is continued until the mass transfer zone of preferentially adsorbed component (O₂) reaches the exit end of the bed without substantially breaking through it. The flow rate during the feed step (Step 1) is maintained at 32.77 Nm³/h and the effluent gas containing 2.0 ppm O₂ at nearly feed pressure and temperature is withdrawn from the product tank (Tank A) as stream 11 (FIG. 2) at a rate of 15.55 Nm³/h. At the termination of the feed step, the bed is connected with the 2nd bed undergoing pressure equalization re-pressurization step (Step 6) and a portion of the void as well as desorbed gas is transferred from the product end of the 1st bed to the product end of the 2nd bed, thus lowering the 1st bed pressure to approximately 4.36 bara at the end of this step (Step 2). Following step 2, a dual end equalization de-pressurization step (Step 3 in FIG. 2) is introduced to transfer more co-adsorbed as well as void gases from the 1st bed to the 2nd bed from both ends of the bed and therefore, the pressure of the 1st bed goes down to approximately 3.12 bara. The dual end re-pressurization can be performed by connecting top ends of the columns and the middle or bottom end of the first bed to the bottom end of the second bed. The column is then counter-currently de-pressurized (Step 4) and thereafter purged (Step 5) counter-currently with primary product gas at 1.32 bara (where the ambient pressure is 1.013 bara). Following the purge step, the column is subsequently pressurized through pressure equalization (Steps 6 and 7) and pressurization (Step 8) steps to bring back the pressure level for initiation and repetition of the aforementioned cycle. With all the steps, the full cycle completes in 550 seconds. The net O₂-free (mostly) argon recovery from the feed gas is 49.97% and the productivity is 43.74 Nm³/h/m³ bed (FIG. 3C). This demonstrates that the proposed process can be used to remove O₂ from a feed gas at low temperature. Further removal of N₂ can be accomplished optionally via distillation or a second layer of adsorbent in the PSA.

Comparative Example: Argon Production Via Ambient PSA with CMS

The 2-bed, 8-step PSA process discussed above with 4A zeolite and NaCHA (1.6) adsorbents is used for process performance evaluation using CMS. Unlike the aforementioned examples, the CMS based process operates at ambient temperature. In addition, the highest and the lowest pressure levels are maintained at approximately 7.22 bara and 1.15 bara, respectively. Thus with CMS at a feed temperature of 20° C., net O₂-free (mostly) argon recovery from the feed gas is 31.20% and the productivity is 30.97 Nm³/h/m³ bed (FIG. 3A). (This process is described in U.S. Pat. No. 7,501,009 to Graham, et al., which is hereby incorporated in its entirety by reference.)

Exemplary Results:

FIGS. 3A to 3C show PSA simulation results, using the cycle steps described above, for each of Examples 1, 2, and the comparative example. Recovery and productivity benefits of cold 4A and cold NaCHA (1.6) vs. ambient CMS as a function of temperature is shown. Optimum productivity occurs around −100° C., where recovery at this temperature is significantly better than ambient temp CMS argon PSA. The simulated performance of cold zeolite argon PSA is also achieved at only 5 bara feed pressure, compared with 7.22 bara feed pressure for CMS. This lower feed pressure is readily achievable in cryogenic distillation plants from static liquid head pressure. The 7.22 bara feed pressure requires an additional compressor. These performance benefits result in the following commercial advantages:

1) Argon recovery is improved from about 30% in CMS to about 50% in zeolites. Recycle back to the distillation column is thus reduced.
2) Argon productivity is improved (e.g., doubled), reducing bed size and cost, and enabling crude argon purification at larger plants.
3) Eliminates safety concern of combustible carbon particles in an O₂ rich environment if recycle is used back to the distillation column. Filters present in CMS argon PSA are eliminated, resulting in reduced equipment and capital expenditure.
4) Feed pressure is reduced to levels where a compressor is not required. Significantly reduces capital, operating, and maintenance costs.

The present invention has been set forth with regard to several exemplary embodiments. However, the scope of the present invention should be ascertained from the claims that follow. For example, any of a variety of arrangements of system components can be used to perform the methods and achieve the desired results and the system and methods can be implemented alone or as part of a larger system or method.

What is claimed is:

1. A method for producing a purified argon product, the method comprising:
   providing a pressurized crude argon vapor stream at a temperature from −186° C. to −20° C.;
   introducing the pressurized crude argon vapor stream into a pressure swing adsorption apparatus containing an oxygen-selective zeolite adsorbent and operating the pressure swing adsorption apparatus at a temperature from −186° C. to −20° C.;
   withdrawing an argon enriched product from the pressure swing adsorption apparatus; and
   regenerating the oxygen-selective zeolite at a pressure greater than prevailing ambient pressure; wherein the operating temperature of the pressure swing adsorption apparatus during operation is not increased except as a function of pressure change or adsorption/desorption.

2. The method of claim 1, wherein the pressurized crude argon vapor stream comes from an air distillation process produced from the top or near top of a crude argon column, having a composition comprising oxygen, nitrogen, and 50 mole % to 99.5 mole % argon.

3. The method of claim 1, wherein the pressurized crude argon vapor stream comprises oxygen, about 70 mole % to about 97 mole % argon, and about 0.5 mole % nitrogen.

4. The method of claim 1, wherein the pressurized crude argon vapor stream is introduced into the pressure swing adsorption apparatus at a temperature from −150° C. to −50° C., and operating the pressure swing adsorption apparatus at a temperature from −150° C. to −50° C.

5. The method of claim 1, wherein the pressurized crude argon vapor stream is introduced into the pressure swing adsorption apparatus at a temperature from −130° C. to −80° C., and operating the pressure swing adsorption apparatus at a temperature from −130° C. to −80° C.

6. The method of claim 1, wherein the pressurized crude argon vapor stream is introduced into the pressure swing adsorption apparatus at a feed pressure from 2 bara to 20 bara.

7. The method of claim 1, wherein the pressurized crude argon vapor stream is introduced into the pressure swing adsorption apparatus at a feed pressure from 2 bara to 8 bara.

8. The method of claim 1, wherein the oxygen-selective zeolite adsorbent is selected from the 4A type zeolites and sodium exchanged chabazite zeolites.

9. The method of claim 1, wherein the oxygen-selective zeolite adsorbent is a sodium exchanged chabazite zeolite having a Si/Al ratio from 1.3 to 1.8.

10. The method of claim 9, wherein the sodium exchanged chabazite zeolite has a Si/Al ratio of about 1.6.

11. The method of claim 1, wherein the pressure swing adsorption apparatus also comprises one or more equilibrium based zeolites for removing nitrogen.

12. The method of claim 11, wherein the equilibrium based zeolites for removing nitrogen are selected from sodium X-type zeolite, calcium X-type zeolite, calcium exchanged A zeolite (CaA or 5A), or combinations thereof.

13. The method of claim 1, wherein prior to introducing the pressurized crude argon vapor stream into the pressure swing adsorption apparatus, at least a portion of the pressurized crude argon vapor stream is increased in pressure to form a compressed argon-containing stream to be fed to the pressure swing adsorption apparatus.

14. The method of claim 1, wherein the pressurized crude argon vapor stream is created by withdrawing crude argon from an air distillation process as a low pressure vapor, warming the low pressure crude argon vapor and compressing the warmed low pressure crude argon vapor from 2 bara to 8 bara to form the pressurized crude argon vapor.

15. The method of claim 14, further comprising cooling the pressurized crude argon vapor to from −186° C. to −20° C.

16. The method of claim 1, wherein the pressurized crude argon vapor stream is created by withdrawing crude argon from an air distillation process as a low pressure vapor and directly compressing the low pressure crude argon vapor to from 2 bara to 8 bara to form the pressurized crude argon vapor.

17. The method of claim 16, further comprising, adjusting the temperature of the pressurized crude argon vapor to from −186° C. to −20° C.

18. The method of claim 1, wherein the pressurized crude argon vapor stream is created by withdrawing crude argon from an air distillation process as a low pressure liquid, increasing the pressure of the low pressure crude argon liquid to from 2 bara to 8 bara, and vaporizing the pressurized crude argon liquid to form the pressurized crude argon vapor stream.

19. The method of claim 18, further comprising adjusting the temperature of the pressurized crude argon vapor stream to from −186° C. to −20° C.

20. The method of claim 1, wherein regenerating the oxygen-selective zeolite adsorbent is conducted at a pressure from 0.1 bar to 0.5 bar above prevailing ambient pressure.

21. The method of claim 1, wherein regenerating the oxygen-selective zeolite adsorbent comprises withdrawing an oxygen-enriched gas from the pressure swing adsorption apparatus and recycling it back into a cryogenic distillation column.

22. The method of claim 1, further comprising feeding the argon enriched product into a distillation column to remove nitrogen.

23. A method for producing a purified argon product, the method comprising:
   providing a pressurized crude argon stream from a first cryogenic distillation column;
   vaporizing the pressurized crude argon stream;
   introducing the vaporized crude argon stream at a temperature from −186° C. to −20° C. and a feed pressure from 2 bara to 8 bara into a pressure swing adsorption (PSA) apparatus containing an oxygen-selective zeolite adsorbent;
   operating the PSA apparatus at a temperature from −186° C. to −20° C.;
   withdrawing an argon enriched product from the PSA apparatus; and
   regenerating the oxygen-selective zeolite at a pressure greater than prevailing ambient pressure; wherein the operating temperature of the PSA apparatus during operation is not increased except as a function of pressure change or adsorption/desorption.

24. The method of claim 23, wherein the vaporized crude argon stream is introduced to the PSA apparatus at a temperature from −150° C. to −50° C., and operating the PSA apparatus at a temperature from −150° C. to −50° C.

25. The method of claim 23, wherein the vaporized crude argon stream is introduced to the PSA apparatus at a temperature from −130° C. to −80° C., and operating the PSA apparatus at a temperature from −130° C. to −80° C.

26. The method of claim 23, wherein the oxygen-selective zeolite adsorbent is selected from 4A zeolites, sodium exchanged chabazites, or combinations thereof.

* * * * *